HIGH SPEED TAPE PERFORATOR

Filed July 14, 1964 2 Sheets-Sheet 1

United States Patent Office 3,260,446

Patented July 12, 1966

3,260,446

HIGH SPEED TAPE PERFORATOR

Rinzo Iwai, Tokyo, and Shoichi Kawamura, Kawasaki, Japan, assignors to Fujitsu Limited, Kawasaki, Japan, a corporation of Japan Filed July 14, 1964, Ser. No. 382,573
8 Claims. (Cl. 234—108)

Our invention relates to a tape perforator, and in a more particular aspect, to perforators for tapes used as data carriers in programming and other data processing apparatus.

The principal object of the invention is to provide a tape perforator capable of operating at high tape speed and combining a simple structure with an efficient performance.

In tape perforators of known type, an intermediary device selects the desired operation by actuating a selector magnet, and the perforator pin is moved to perforate the tape. This known type of tape perforator requires four specific operating times: the operating time of the selector magnet, the operating time of the intermediary device, the operating time of the pin in its up and down movement, and the operating time of the feeding of the tape. In order to increase the speed of operation, each of these operating times must be shortened. Furthermore, high precision machining and high speed selector magnets create additional difficulties if utilized in perforators.

In accordance with the invention, the speed of operation of a tape perforator is increased by shortening of the operating time of the pin in its movement and this is achieved by mechanically linking the rotor of the pin actuating rotary magnet to the perforating pin.

In order that the present invention may be readily carried into effect, it will now be described with reference to the accompanying drawings, wherein.

Figure 1:
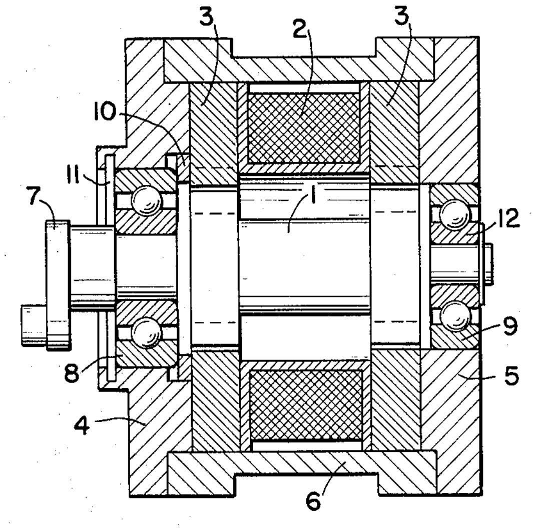
FIG. 1 is an axial section of an embodiment of a pin actuating rotary magnet which may be utilized as the pin actuating rotary magnet of the present invention.
Figure 3:
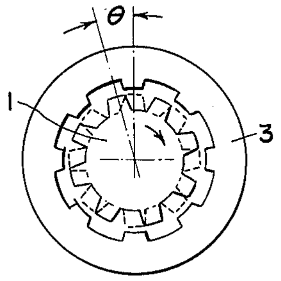
FIG. 3 is a cross-sectional schematic illustration indicating the relationship of the stator and rotor of the pin actuating rotary magnet of FIG. 1.

FIGS. 1 and 3 illustrate a pin actuating rotary magnet which may be utilized in the tape perforating arrangement of the present invention. In FIGS. 1 and 3, a rotor 1 is surrounded by a coil 2 coaxially positioned therewith. A stator 3 is coaxially positioned with the rotor 1 and surrounds said rotor. Each of the rotor 1 and stator 3 has a plurality of spaced teeth formed on the surface facing the other, as shown in FIG. 3.

Figure 5:
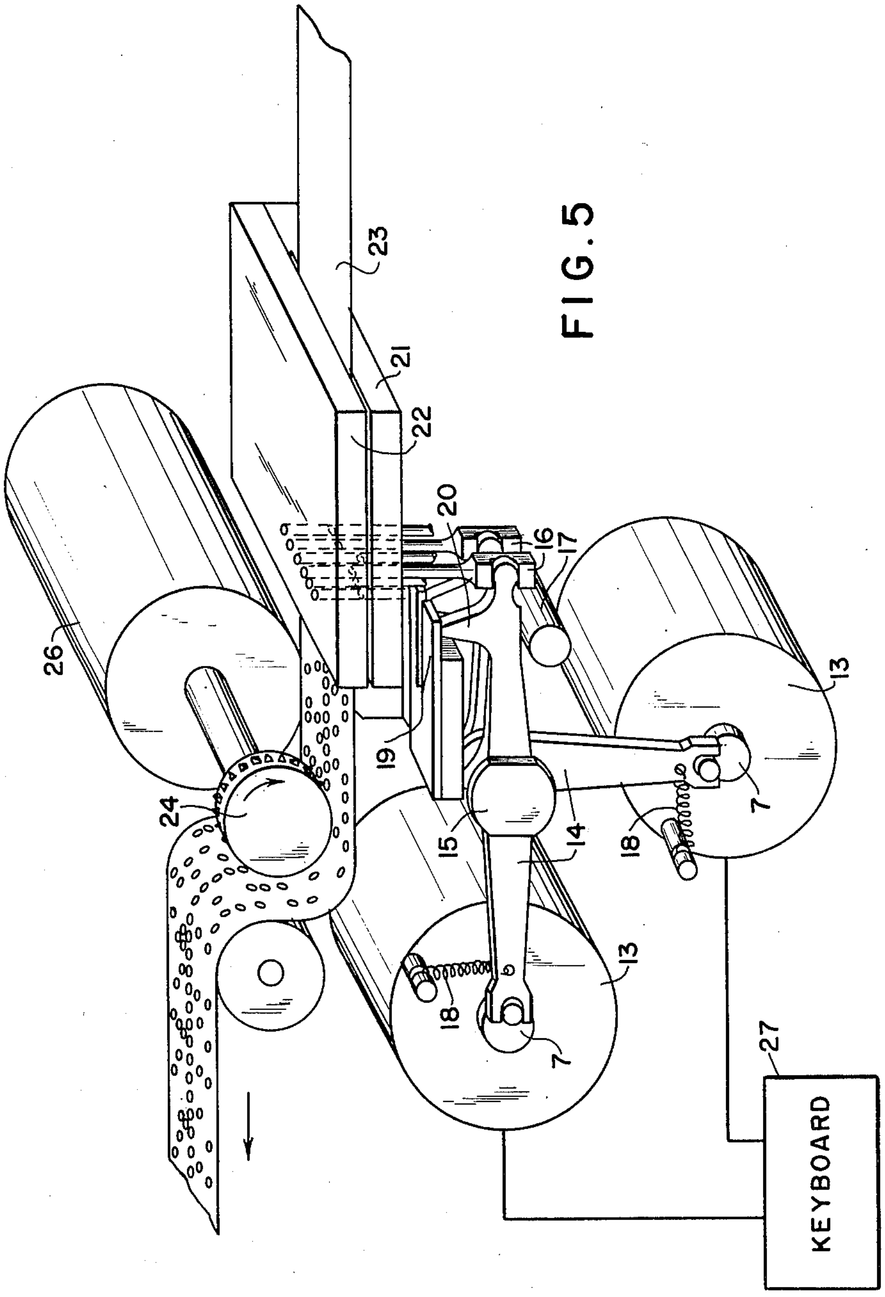
FIG. 5 is a perspective view of an embodiment of a tape perforating arrangement of the present invention.

A non-magnetizing flange 4 and 5 is positioned coaxially with the rotor 1 and alongside the stator 3. Part of the magnetic flux circuit is the casing 6. A crank 7 is affixed to the rotor 1 to rotate therewith and may be integrally formed with the rotor. The rotor 1 is rotatably mounted in bearings 8 and 9 and is thus adapted to be angularly displaced in a determined direction about its axis when the stator is electrically energized (FIG. 5). Retainer rings 10, 11 and 12 are provided for the bearings 8 and 9 and for the rotor 1.

If a proper amount of current is applied to the coil 2 the stator 3 is electrically energized and applies a rotation torque to the rotor 1. The rotor 1 is thus angularly displaced $\theta$ degrees in a clockwise direction about its axis. Although maximum rotation torque is initially applied to the rotor 1 by the stator 3, the rotation torque gradually decreases and becomes zero after an axial angular displacement of $\theta$ degrees, at which the teeth of the rotor and stator are radially aligned, as shown by broken lines in FIG. 3. If the stator 3 is energized beyond its proper value, the rotor 1 continues to be displaced in the clockwise direction about its axis for an additional angle until it reverses its direction of rotation and rotates in a counterclockwise direction about its axis until it reaches its radially aligned position, as shown in FIG. 3.

Figure 2:
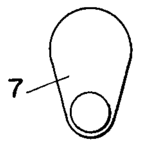
FIG. 2 is an end view of the crank 7 of the pin actuating rotary magnet of FIG. 1.
Figure 4:
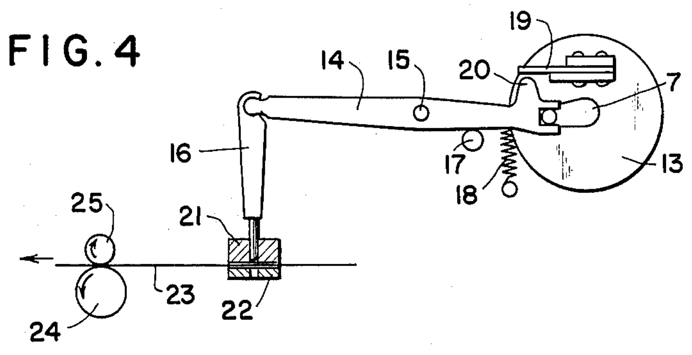
FIG. 4 is a side view, partly in section, of an embodiment of a single perforating pin arrangement of the tape perforating arrangement of the present invention.

In FIG. 4, a single perforating pin arrangement of the tape perforating arrangement of the present invention is shown. In FIG. 4, the pin actuating rotary magnet of FIG. 1 is denoted by 13. The crank 7 of FIGS. 1 and 2 rotates with the rotor of the pin actuating rotary magnet 13. The rotor of the pin actuating rotary magnet 13 is mechanically coupled by a linking arrangement to a perforating pin 16 in a manner whereby the angular displacement of said rotor in the determined direction about its axis to its perforating position moves said pin from an inoperative position, in which the pin is spaced from the tape, to an operative or perforating position, in which the in perforates the tape.

The linking arrangement includes the crank 7, a crank arm 14 pivotally mounted on a pivot pin 15 and having a protruding portion 20 at a point spaced from the pivot pin 15, and a coupling device coupling the perforating pin 16 to the crank arm at a point spaced from the pivot pin.

A resilient member such as, for example, a leaf spring 19 is mounted to react to an impact force and is positioned such as, for example, on the pin actuating rotary magnet housing so that it is abutted by the protruding portion 20 of the crank arm 14 just prior to the time that the perforating pin 16 reaches its perforating position. A spring 18 cooperates with a stopping member 17 to urge the crank arm 14 in a clockwise direction and thus urge the perforating pin 16 to remain in its inoperative position.

If it is desired to perforate the tape with the perforating pin 16, an energizing current is supplied to energize the stator 3 and rotate the rotor 1 and the crank 7 in a determined direction about its axis for an angular displacement from an initial position to a perforating position. If the determined direction of displacement of the rotor 1, and thus the crank 7, is clockwise, the crank arm 14 is pivotted about the pivot pin 15 in a counterclockwise direction by the crank. In moving in a counterclockwise direction, the crank arm 14 moves the perforating pin 16 down to perforate the tape.

The crank arm 14, in moving in a counterclockwise direction, abuts the resilient member 19 with the protruding portion 20 at a time just prior to the time that the perforating pin 16 reaches its perforating position. The perforating pin 16 thus perforates the tape and the resilient member 19 reacts to the force of impact of the protruding portion with an opposite force which drives the crank arm 14 back in a clockwise direction about the pivot pin 15, thereby returning the perforating pin to its inoperative position to reset said perforating pin and displacing the rotor 1 of the pin actuating rotary magnet 13 in the counterclockwise direction to its initial position.

The perforating pin 16 is guided by a guide block 21 which directs it to tape 23 which in turn is guided by a die 22. When the pin actuating rotory magnet 13 is deenergized after a predetermined period of time, the crank arm 14 is pivotted about the pivot pin 15 in a clockwise direction, as described, and the spring 18 continues the clockwise movement of said crank arm until said crank arm abuts the stopping member 17.

When the perforating pin 16 is withdrawn from the tape 23 and is moving toward its inoperative position, the tape may be moved to position for the next perforating operation. This may be accomplished in any suitable manner, such as, for example, by a roller 25 which may be driven by the rotor of the pin actuating rotary magnet 13 or from the same source that energizes the stator of said pin actuating rotary magnet. Thus, by a suitable arrangement, the tape 23 may be moved to its next perforating position by the rotor returning to its initial position from its perforating position. This may be accomplished via the roller 25 and a roller 24.

The use of the resilient member 19 in the aforedescribed manner further increases the speed of operation of the tape perforator of the present invention. This is due to the operation of the resilient member 19 in absorbing the force of impact of the protruding portion 20 of the crank arm 14 and in exerting the force of impact on said crank arm as a reaction or opposite force to drive the protruding portion, and thus the crank arm, back to its reset or inoperative position, thereby shortening the reset time.

In the aforedescribed operation, only about 30% of the time of operation is utilized for the tape perforating operation and the remaining 70% may be utilized for the tape feeding operation. Thus, since only about 30% of the time of operation is actually utilized for perforation, the speed of operation of the tape perforator is considerably increased.

FIG. 5 is an embodiment of a tape perforating arrangement of the present invention. The embodiment of FIG. 5 utilizes a plurality of pin actuating rotary magnets 13, although only two are shown. In a five-hole code perforating arrangement, five perforating pins are utilized and therefore five pin actuating rotary magnets are utilized; each of the perforating pins being coupled to a corresponding magnet via the corresponding rotor of the magnet and the corresponding crank and crank arm. Each of the magnet-perforating pin units operates in the manner described with relation to the embodiment of a single perforating pin arrangement of FIG. 4. In order to accommodate the required number of pin actuating rotary magnets 13, the crank arms 14 may have to be shaped differently from each other, although they function in the same manner. Thus, in the embodiment of FIG. 5, one crank arm 14 is of substantially straight-rod configuration and the other crank arm is of substantially L-shaped configuration.

If it is desired to perforate the tape 23 with a desired signal, the desired signal is indicated manually by the operator on a suitable device such as, for example, a keyboard 27, which is electrically connected to the coil (FIG. 1) of each pin actuating rotary magnet 13. When the desired keys of the keyboard are depressed, an energizing current is supplied to the coil of each desired magnet and energizes the stator thereof. When the stator is energized, it rotates the corresponding rotor and the corresponding crank 7 in a determined direction about its axis for an angular displacement from an initial position to a perforating position. If the determined direction of displacement of each of the rotors, and thus each of the cranks, is clockwise, each of the corresponding crank arms 14 of the rotated cranks 7 is pivotted about its pivot pin 15 in a counterclockwise direction by its corresponding crank. In moving in a counterclockwise direction, each crank arm 14 moves the corresponding perforating pin 16 up to perforate the tape 23.

The corresponding crank arm 14 of each energized pin actuating rotary magnet 13, in moving in a counterclockwise direction, abuts the resilient member 19 with the protruding portion 20 at a time just prior to the time that the corresponding perforating pin 16 reaches its perforating position. The perforating pin 16 corresponding to each energized pin actuating rotary magnet 13 thus perforates the tape 23 and the corresponding resilient member 19 reacts to the force of impact of the protruding portion with an opposite force which drives the corresponding crank arm back in a clockwise direction about its pivot pin 15, thereby returning each perforating pin to its inoperative position to reset the perforating pin and displacing the corresponding rotor of the corresponding pin actuating rotary magnet 13 in the counterclockwise direction to its initial position.

The perforating pins 16 are guided by a guide block 21 which directs them to the tape 23 which is guided by the die 22. When the energized pin actuating rotary magnets 13 are deenergized after a predetermined period of time, the corresponding crank arms 14 are pivotted about their pivot pins 15 in a clockwise direction, as described, and the spring 18 of each of said crank arms continues the clockwise movement of the said crank arms until each of the said crank arms 7 abuts its corresponding stopping member 17.

A pulse motor 26 drives the tape 23 through a sprocket wheel 24. The pulse motor 26 is controlled by a feeding signal in any suitable known manner to drive the tape 23 after a perforating operation to its next perforating position. The feeding signal supplied to the pulse motor 26 causes said motor to rotate the sprocket wheel 24 to feed or drive the tape 23 the required distance such as, for example, 2.54 mm., to the next perforating position. The perforating operation may then be repeated.

We claim:

1. In a tape perforating arrangement, a movably mounted pin positioned and adapted to perforate a tape;

a pin actuating rotary magnet having a stator adapted to be electrically energized when the tape is desired to be perforated by said pin and a rotatably mounted rotor adapted to be angularly displaced in a determined direction about its axis from an initial position to a perforating position upon electrical energization of said stator;

linking means mechanically coupling the rotor of said pin actuating rotary magnet to said pin in a manner whereby angular displacement of said rotor in said determined direction about its axis to its perforating position moves said pin from an inoperative position to an operative position to perforate said tape; and pin resetting means positioned and adapted to abut said linking means just prior to the time that said pin reaches its perforating position for returning said pin to its inoperative position and for displacing the rotor of said pin actuating rotary magnet in the direction opposite said determined direction to its initial position.

2. In a tape perforating apparatus as claimed in claim 1, said pin resetting means comprising a resilient member mounted to react to an impact force.

3. In a tape perforating apparatus as claimed in claim 1, said pin resetting means comprising a leaf spring.

4. In a tape perforating apparatus, a plurality of movably mounted pins spaced from each other and positioned and adapted to perforate a tape;

a pin actuating rotary magnet for each of said pins, each said rotary magnet having a stator adapted to be electrically energized when the tape is desired to be perforated by the corresponding pin and a rotatably mounted rotor adapted to be angularly displaced in a determined direction about its axis from an initial position to a perforating position upon electrical energization of said stator; and linking means mechanically coupling the rotor of each pin actuating rotary magnet to the corresponding one of said pins in a manner whereby angular displacement of a rotor in said determined direction about its axis to its perforating position moves its corresponding pin from an inoperative position to an operative position to perforate said tape; and a plurality of pin resetting means each positioned and adapted to abut a corresponding linking means just prior to the time that the corresponding pin reaches its perforating position for returning said corresponding pin to its inoperative position and for displacing the rotor of the corresponding pin actuating rotary magnet in the direction opposite said determined direction to its initial position.

5. In a tape perforating apparatus as claimed in claim 4, each of said pin resetting means comprising a resilient member mounted to react to an impact force.

6. In a tape perforating apparatus as claimed in claim 4, each of said pin resetting means comprising a leaf spring.

7. In a tape perforating arrangement, a movably mounted pin positioned and adapted to perforate a tape;

a pin actuating rotary magnet having a stator adapted to be electrically energized when the tape is desired to be perforated by said pin and a rotatably mounted rotor adapted to be angularly displaced in a determined direction about its axis from an initial position to a perforating position upon electrical energization of said stator;

linking means mechanically coupling the rotor of said pin actuating rotary magnet to said pin in a manner whereby angular displacement of said rotor in said determined direction about its axis to its perforating position moves said pin from an inoperative position to an operative position to perforate said tape, said linking means comprising a crank affixed to said rotor, a crank arm pivotally mounted by pivot means and having a protruding portion at a point spaced from said pivot means adapted to abut said pin resetting means just prior to the time that said pin reaches its perforating position, and means coupling said pin to said crank arm at a point spaced from said pivot means; and pin resetting means positioned and adapted to abut said linking means just prior to the time that said pin reaches its perforating position for returning said pin to its inoperative position and for displacing the rotor of said pin actuating rotary magnet in the direction opposite said determined direction to its initial position.

8. In a tape perforating apparatus, a plurality of movably mounted pins spaced from each other and positioned and adapted to perforate a tape;

a pin actuating rotary magnet for each of said pins, each said rotary magnet having a stator adapted to be electrically energized when the tape is desired to be perforated by the corresponding pin and a rotatably mounted rotor adapted to be angularly displaced in a determined direction about its axis from an initial position to a perforating position upon electrical energization of said stator; and linking means mechanically coupling the rotor of each pin actuating rotary magnet to the corresponding one of said pins in a manner whereby angular displacement of a rotor in said determined direction about its axis to its perforating position moves its corresponding pin from an inoperative position to an operative position to perforate said tape, each of said linking means comprising a crank affixed to the rotor of the corresponding pin actuating rotary magnet, a crank arm pivotally mounted by pivot means and having a protruding portion at a point spaced from said pivot means adapted to abut the corresponding pin resetting means just prior to the time that the corresponding pin reaches its perforating position, and means coupling said corresponding pin to said crank arm at a point spaced from said pivot means; and a plurality of pin resetting means each positioned and adapted to abut a corresponding linking means just prior to the time that the corresponding pin reaches its perforating position for returning said corresponding pin to its inoperative position and for displacing the rotor of the corresponding pin actuating rotary magnet in the direction opposite said determined direction to its initial position.

References Cited by the Examiner

UNITED STATES PATENTS

| | | | |
|---|---|---|---|
| 3,018,040 | 1/1962 | Wales | 234—108 X |
| 3,071,317 | 1/1963 | Mills | 234—108 X |

WILLIAM S. LAWSON, *Primary Examiner.*